United States Patent [19]

Jenkner

[11] Patent Number: 5,004,381
[45] Date of Patent: Apr. 2, 1991

[54] DRILLING MACHINE FOR PLANAR FACE AND/OR END FACE DRILLING ON PANEL-TYPE WORKPIECES OR PANEL BLANKS

[76] Inventor: Erwin Jenkner, Linden Strasse 13, D-7261 Gechingen, Fed. Rep. of Germany

[21] Appl. No.: 168,649

[22] Filed: Mar. 16, 1988

[30] Foreign Application Priority Data

Mar. 21, 1987 [DE] Fed. Rep. of Germany ... 8704263[U]

[51] Int. Cl.⁵ .............................................. B23B 39/16
[52] U.S. Cl. ....................................... 408/31; 144/92; 408/42; 408/62
[58] Field of Search ........................ 408/31, 36, 42, 43, 408/44, 49, 50, 51, 52, 53, 62, 69, 70, 88, 103, 63, 64, 66; 29/50, 51, 52, 53, 54, 55, 565, 564; 144/3 R, 92, 93, 108; 409/158

[56] References Cited

U.S. PATENT DOCUMENTS

| | | | |
|---|---|---|---|
| 560,234 | 5/1896 | Rockwell | 408/36 |
| 568,320 | 9/1896 | Poertner | 408/36 |
| 705,658 | 7/1902 | Edwards et al. | 408/36 |
| 4,088,417 | 5/1978 | Kosmowski | 408/43 |
| 4,480,364 | 11/1984 | Kosmowski | 408/69 |
| 4,694,871 | 9/1987 | Jenkner | 144/35 R |

FOREIGN PATENT DOCUMENTS

| | | | |
|---|---|---|---|
| 135849 | 4/1985 | European Pat. Off. | 408/69 |
| 3406367 | 8/1985 | Fed. Rep. of Germany | 408/69 |
| 3522278 | 6/1986 | Fed. Rep. of Germany | |
| 56-310 | 5/1981 | Japan | 408/42 |

Primary Examiner—Daniel W. Howell
Attorney, Agent, or Firm—Dick and Harris

[57] ABSTRACT

A drilling machine for planar face and/or end face drilling on panel-type workpieces or panel blanks which offers advantageous machining possibilities is described. Associated with the drilling machine on its operating side opposite the workpiece advancing device are a workpiece aligning table with a side stop, at either side, and a clamping device for fixing workpieces or panel blanks on the workpiece supporting table. It is, for example, thereby possible for two workpieces which belong to one piece of furniture, and in which assembly bores are to be made in mirror-image relationship, to be jointly placed on one of the workpiece aligning tables, in each case, aligned at their respective side stop and then clamped in the workpiece slider of the workpiece advancing device. The idle times of the machine can thus be reduced to a minimum.

5 Claims, 4 Drawing Sheets

DRILLING MACHINE FOR PLANAR FACE AND/OR END FACE DRILLING ON PANEL-TYPE WORKPIECES OR PANEL BLANKS

BACKGROUND OF THE INVENTION

The present invention is associated with a drilling machine of the kind known from German Offenlegungsschrift (unexamined Patent Application) No. 3,522,278. This known drilling machine combined with a workpiece advancing device can be interlinked with a panel splitting machine so as to enable the panels obtained from splitting up panel-type workpieces to also be drilled at the same time without having to be removed from the panel splitting machine.

The object underlying the invention is to enable such a drilling machine to also be used on its own as a machining apparatus and to enable assembly bores to be made in an efficient manner in panel-type workpieces or panel blanks using this drilling machine.

This object is accomplished, in accordance with the invention, by there being associated with the drilling device on its operating side opposite the workpiece advancing device, a workpiece aligning table with a side stop, at either side, and a clamping device for fixing workpieces or panel blanks on the workpiece supporting table.

Such a machine concept offers advantageous machining possibilities. For example, two workpieces which belong to one piece of furniture and in which assembly bores are to be made in mirror-image relationship may be jointly placed on one workpiece aligning table, in each case, aligned at their respective side stop and clamped in the workpiece slider of the workpiece advancing device. Both workpieces can then be drawn back into a rear initial position by the workpiece slider, transported stepwise in the opposite direction again, immobilized in specified machining positions, for example, in a program controlled manner, and successively drilled in mirror-image relationship in the same workpiece area, in each case, by the drilling device. In this case, one pair of workpieces at a time is finished on the drilling machine.

It is however, also possible to deposit workpieces alternately on the workpiece aligning tables and to align these in such a way that by means of the workpiece slider, one workpiece aligned on the one workpiece aligning table is driven into its rear initial position and then transported stepwise in the direction of advance for assembly bores to be made in it. During the drilling operations, a further workpiece can then be deposited and aligned on the other workpiece aligning table and clamped in the workpiece slider once the other workpiece has been transported back to its initial position after completion of the drilling. While the new workpiece to be drilled is first drawn back and then displaced stepwise again in the opposite direction for drilling, the workpiece on which drilling has been completed can be removed from the machine and a further workpiece to be drilled in mirror-image relationship deposited on the respective workpiece aligning table.

Equipping the drilling machine with two workpiece aligning tables, therefore, enables the idle times of the machine to be kept to a minimum and the output of the machine to be doubled per time unit. Also, the work of the operating staff is considerably simplified since, for example, right-hand furniture components can be deposited on the right and left hand furniture components on the left workpiece aligning table.

These and other objects of the invention will become apparent in light of the present specification and drawings.

SUMMARY OF THE INVENTION

The present invention comprises a drilling machine for planar face or end face drilling on panel-type workpieces or panel blanks. The drilling machine has a workpiece supporting table which has a supporting surface positioned thereon. In addition, the drilling machine also includes a work advancing device which is operably associated with the workpiece supporting table. The workpiece advancing device further includes a front end. A workpiece slider is operably associated with the workpiece advancing device, and can be manuevered along a particular direction of advance.

A drilling device is also included, which has an operating side, and is positioned at the front end of the workpiece advancing device. The drilling device can additionally be displaceable, and immobilizable along a direction of displacement which is transverse to the direction of advance and is parallel to the supporting surface of the workpiece supporting table. The drilling device is operably positioned transversely to the direction of advance of the workpiece slider.

The drilling machine has at least one drilling unit which is operably associated with the drilling device for planar face, or end face drilling. The drilling units are operably associated with at least one drill spindle. The drill spindle for end face drilling is adjustable in the direction of advance of the workpiece slider, as well as in a direction perpendicular thereto. A workpiece aligning table is also included, which is operably associated with the drilling device, and which is positioned proximate to the operating side of the drilling device, which is opposite to the workpiece advancing device, and which has a plurality of sides. The drilling machine has at least one housing side stop which is operably associated with the workpiece aligning table at a side thereof. In addition, a clamping device is also included, which is operably associated with the workpiece supporting table for fixing workpieces or panel blanks thereon.

In the preferred embodiment of the invention, the drilling machine further includes the workpiece supporting table which is arranged below the drilling device. The workpiece supporting table additionally includes an opening which is positioned above the drilling device.

In the preferred embodiment of the invention, the drilling device further comprises two horizontal drill spindles, which are arranged coaxially with each other. These drill spindles extend in opposite directions so as to facilitate end face drilling.

In the preferred embodiment of the invention, the drilling device further comprises two horizontal drill spindles which are arranged parallel to each other. These drill spindles extend in opposite directions so as to facilitate end face drilling.

In the preferred embodiment of the invention, the drilling device additionally comprises a slide-type carrier which is horizontally displaceable, as well as immobilizable along a guide frame.

DETAILED DESCRIPTION OF THE DRAWINGS

Figure 1:
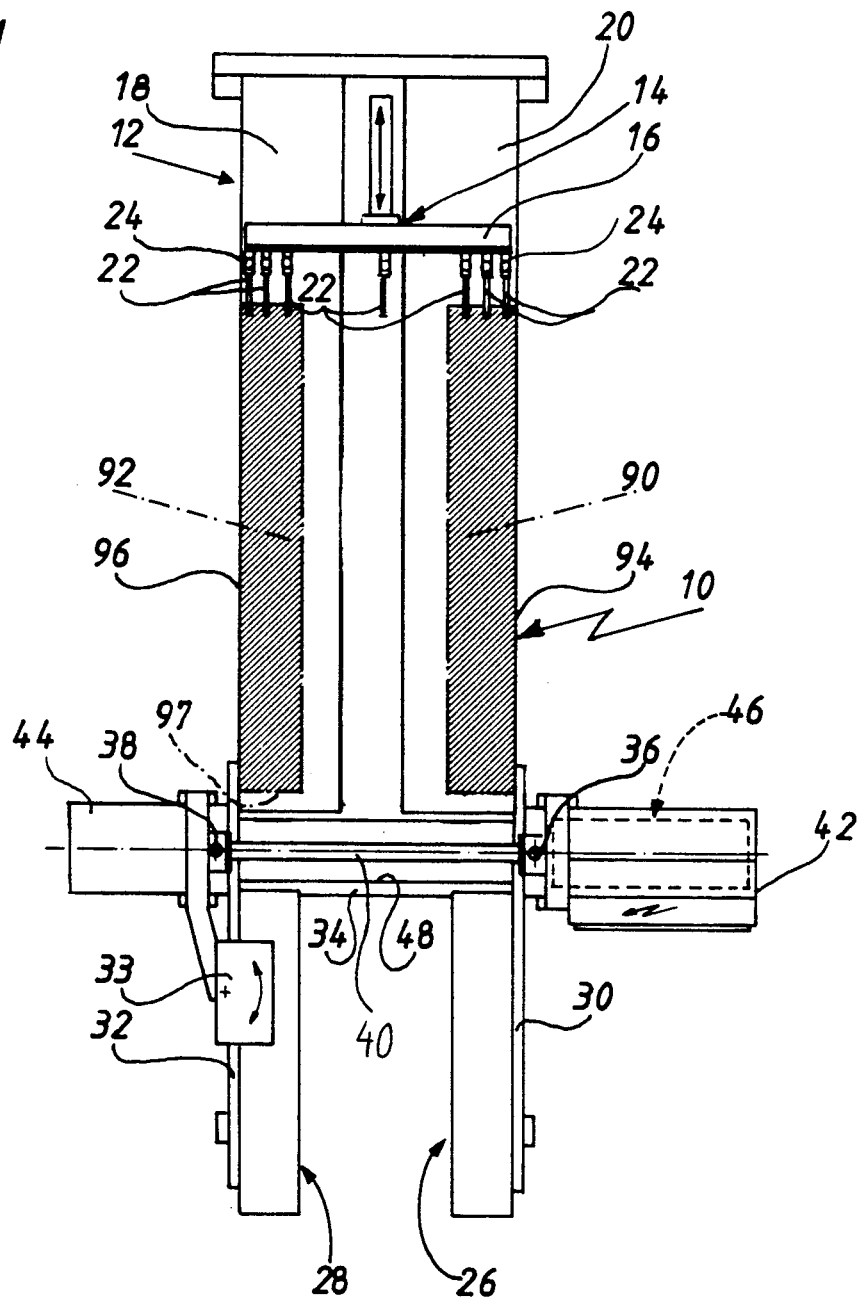
FIG. 1 is a plan view of the drilling machine with a panel blank clamped on the right side and on the left side, respectively, of the workpiece slider which has drawn these panel blanks into their rear initial position.

While this invention is susceptible of embodiment in many different forms, there is shown in the drawings and will herein be described in detail, a specific embodiment, with the understanding that the present disclosure is to be considered as an exemplification of the principles of the invention and is not intended to limit the invention to the embodiment illustrated.

Figure 2:
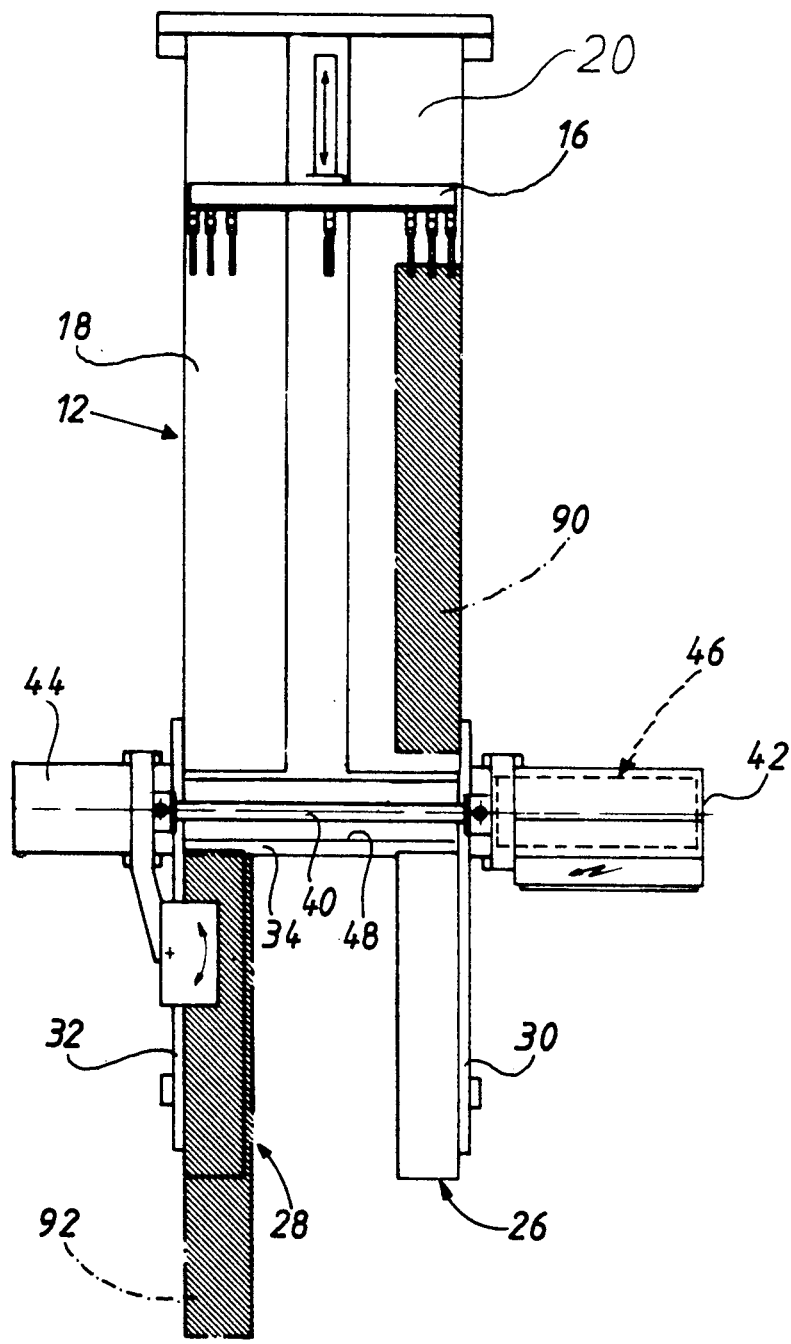
FIG. 2 is an illustration similar to FIG. 1 but with only one panel blank drawn back into the rear initial position, while a further panel blank has been deposited and aligned on one of the workpiece aligning tables.

The drilling machine shown in FIGS. 1 and 2 is designated in its entirety 10. It comprises a workpiece supporting table 12 with which a workpiece advancing device 14 is associated. The workpiece advancing device 14 is equipped with a workpiece slider 16 which is guided above the table surface defined by two table plates 18, 20 arranged in parallel spaced relation to each other and extending in the direction of advance. The workpiece slider 16 is drivable back and forth in the directions indicated by arrows by, for example, a drivable threaded spindle. The drive means are not illustrated. The workpiece slider 16 is equipped with a plurality of clamps 22, for example, three clamps at each of its side ends and one clamps at its center. These are each openable and closable by, for example, a pneumatic cylinder 24.

A right-hand workpiece aligning table 26 and a left-hand workpiece aligning table 28, each having a side stop 30 and 32, respectively, are arranged at the front end, i.e., on the operating side of the workpiece supporting table 12.

The table plates 18, 20 are joined on the operating side by a cross member 34. The workpiece aligning tables 26 and 28 which are preferably adjustable and immobilizable in the transverse direction are built onto the cross member 34 in a preferably removable manner. A press beam 40 guided in a raisable and lowerable manner by cylinder units 36 and 38 which are preferably pneumatically actuated, is arranged above cross member 34. Workpieces in which holes are to be drilled can be clamped on cross member 34 by means of press beam 40.

Figure 3:
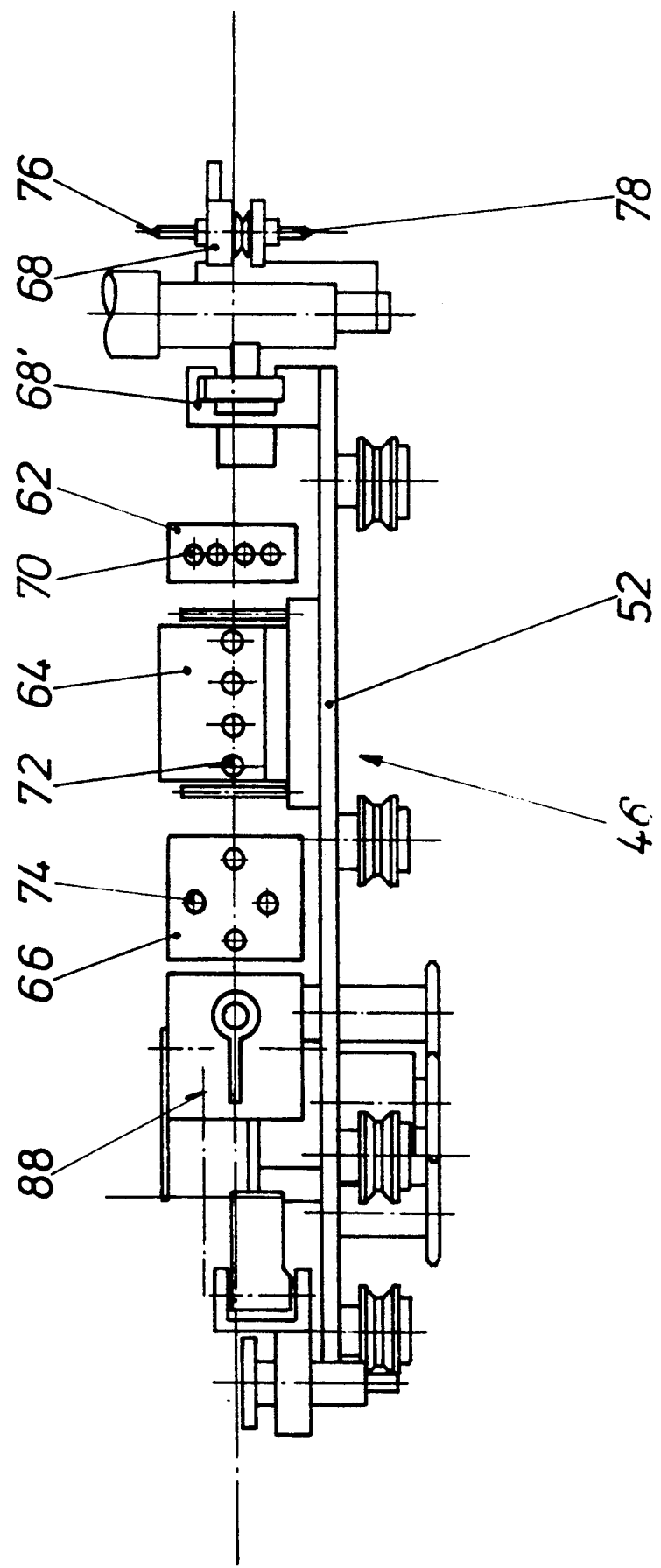
FIG. 3 is a plan view of the drilling device.

Guiding devices 42 and 44 with guide means for guiding a drilling device, designated in its entirety 46, are built onto the end faces of the cross member. The drilling device 46 is displaceable beneath the table transversely to the direction of advance of the workpiece advancing device 14 and immobilizable in specified drilling positions, preferably in a program controlled manner. Details of the design and guidance of drilling device 46 are apparent from FIGS. 3 and 4.

To enable assembly bores to be made in both the underside and the end faces of panel-type workpieces or panel blanks, the cross member has a slot-type opening 48 extending over the entire width of the workpiece support table 12.

The drilling device 46 has a slide-type carrier 52 which is displaceably guided in a guide frame 53 perpendicularly to the direction of advance of the workpiece slider 16 on guide rails 54 and 56 arranged in superimposed relation to each other. Four drill heads 62, 64, 66 and 68 are, for example, arranged on the slide-type carrier 52. Drill heads 62 and 64 each have one row of, for example, four drill spindles 70 and 72, respectively, which are spatially associated with one another in accordance with a desired drilling pattern. The same applies to drill spindles 74 and drill head 66.

The individual drill heads 62 and 68 are arranged behind one another. The mutual association of drill heads 62 and 64 is such that their rows of drill spindles 70, 72 extend perpendicularly to one another in a horizontal plane. Accordingly, one row of drill spindles extends perpendicularly and the other row of drill spindles parallel to the longitudinal direction of the slot-type opening 48. Drill heads 62, 64 and 66 serve to make assembly bores on the underside of panel-type workpieces or panel blanks. To do so, these drill heads are driven vertically upwardly relative to carrier 52 in an appropriate manner. This can, for example, be carried out pneumatically.

Figure 4:
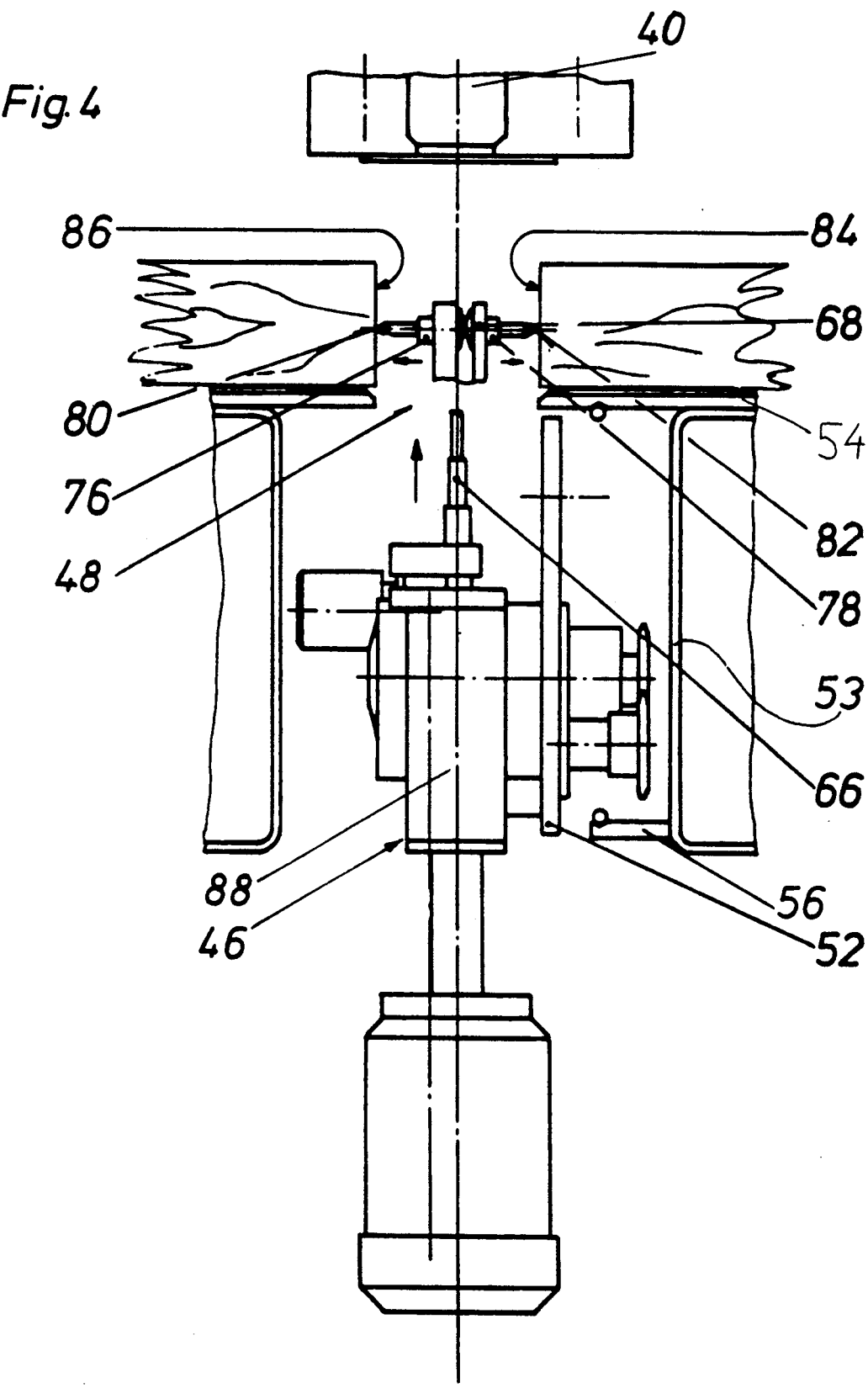
FIG. 4 is a front view of the drilling device illustrating the drilling unit for end face drilling which has been driven into its working position.

Drill head 68 serves to make bores in end edges of workpieces or panel blanks. For this purpose, this drill head 68 is equipped with a column-type attachment 68' having in its upper end region two drill spindles 76 and 78 which are horizontally mounted and are preferably arranged coaxially with each other. Both drill spindles 76, 78 are jointly or separately drivable in the same or opposite directions of rotation. Drill head 68 is arranged on carrier 52 for adjustment, for example, pneumatically, in the vertical direction. Therefore, when not in use, it can move downwardly, in the same manner as the other drill heads. As shown in FIG. 4, when drill head 68 is in its working position, its two drill spindles 76 and 78 and drills 80, 82 inserted in these, extend in the direction of workpiece end faces 84 and 86 which face each other.

The carrier 52 of this embodiment is equipped with an assembly device 88 by means of which, for example, fittings can be automatically pressed into assembly bores which have been previously made in workpieces. It is, of course, also possible to provide several such assembly devices. The slide-type carrier 52 is adjustable and immobilizable, more particularly, in a program controlled manner, by means of a transporting device, not shown in detail, relative to the workpieces or panel blanks in which bores are to be made. Depending on which drill head, or drill heads, is or are required, the drilling device 46 can be driven into one or several specified machining positions and the drill heads 62 to 68 and, where appropriate, also the assembly device 88 then become operable.

Workpieces are machined in the following way with the above-described drilling machine:

By providing two workpiece aligning tables 26 and 28, for example, as shown in FIG. 1 and FIG. 2, two panel blanks 90, 92 which belong to the body of one piece of furniture and in which holes are to be drilled in mirror-image relationship on a planar side can be simultaneously deposited on the drilling device and one panel blank 90 aligned along its right-hand reference or longitudinal edge 94 at side stop 30 of workpiece aligning table 26 and the other panel blank 92 aligned along its left-hand reference or longitudinal edge 96 at side stop 32 of workpiece aligning table 28. Workpiece slider 16 of workpiece advancing device 14 is then moved by means of switching device 33 from its rear initial position shown in FIG. 1 into its front end position, and its clamps 22 are brought into their open position by means of pneumatic cylinders 24. When workpiece slider 16 has reached its front end position, the upper end face of the two panel blanks 90 and 92, in accordance with FIG. 1, can be inserted as far as the limit into clamps 22 by the operator standing between the two workpiece aligning tables 26 and 28. Exact alignment of the reference or longitudinal edges 94 and 96 of panel blanks 90, 92 is ensured by these being moved along side stops 30, 32. A certain drilling program can then be called by means of the switching device 33 and after that the subsequent work steps are automatically carried out.

The clamps 22 are first closed to clamp the panel blanks 90, 92 and the workpiece slider 16 is then driven back into its rear position. The panel blanks 90, 92 are then jointly advanced by workpiece slider 16 in the direction of advance into their first drilling position. Once the corresponding advancing step has been carried out, press beam 40 is driven downwards into clamping position by cylinder units 36, 38 and positioned on the panel blanks in order to clamp these in the region of cross member 34 on the workpiece supporting table 12. The drilling device 46 is then driven to the left, in accordance with FIG. 1, into a first specified drilling position and one or possibly several bores are made in the planar underside of panel blank 90 with one of the drilling units 62 to 68, depending on how these are equipped with drill spindles. In addition, one or several end face bores can also be subsequently made in the lower end edge 96 of this panel blank 90, in accordance with FIG. 1, by drill spindle 76, i.e., drill 80, as shown in FIG. 4. The drilling device 46 is then brought into the working position for panel blank 92, in which, mirror-image relationship, the same planar side bores and possibly one or several bores are made in end edge 97. Press beam 40 is afterwards raised into its released position. Panel blanks 90, 92 are then moved by workpiece slider 16 in the direction of advance into a further drilling position. After the panel blanks have been clamped again by press beam 40, drilling device 46 can make further planar side bores in both panel blanks 90, 92. To do so, the drilling device can first be driven back again into the initial position shown in FIG. 1 and, therefore, during each drilling operation, panel blank 90 is drilled first. It is, however, also possible for the machining program to be so designed that after each advance, drilling device 46 is first positioned again on that panel blank on which the last drilling operation was carried out. Accordingly, a pair of panel blanks 90, 92 in which holes are to be drilled in mirror-image relationship can always be finished simultaneously.

As shown in FIG. 2, it is, however, also possible, for example, during drilling of panel blank 90, for the operator to place on workpiece aligning table 28 a panel blank 92 which can then be inserted into clamps 22 of workpiece slider 16 when these are opened to release the finished panel blank 90. While drilling is being carried out on panel blank 92, a further panel blank can then be placed and aligned on workpiece aligning table 26.

The foregoing description and drawings merely explain and illustrate the invention, and the invention is not limited thereto except insofar as the appended claims are so limited, as those skilled in the art who have the disclosure before them will be able to make modifications and variations therein without departing from the scope of the invention.

What is claimed is:

1. A drilling machine for planar face or end face drilling on panel-type workpieces or panel blanks, said drilling machine comprising:
    a workpiece supporting table having a supporting surface thereon;
    a workpiece advancing device operably associated with said workpiece supporting table;
    said workpiece advancing device further having a front end;
    a workpiece slider operably associated with said workpiece advancing device and advanceable along a direction of advance;
    a drilling device, having an operating side, positioned at a front end of said workpiece advancing device;
    said drilling device further being displaceable and immobilizable along a direction of displacement transverse to said direction of advance and parallel to said supporting surface of said workpiece supporting table;
    said drilling device being further operably positioned transversely to said direction of advance of said workpiece slider;
    means for displacing said drilling device along said direction of displacement transversely to said direction of advance and parallel to said supporting surface;
    said drilling device having one or more drilling units operably associated with said drilling device for planar face drilling, and one or more drilling units operably associated with said drilling device for end face drilling;
    said one or more drilling units for end face drilling having associated therewith at least one drill spindle for end face drilling in said direction of advance of said workpiece slider, which is adjustable in a direction perpendicular to said workpiece supporting surface;
    two workpiece aligning tables operably associated with said drilling device and positioned proximate to said operating side of said drilling device, in spaced, parallel relation to each other, opposite said workpiece advancing device, each said workpiece aligning table having a plurality of sides so as to enable substantially continuous operation of said drilling device upon workpieces positioned on said two workpiece aligning tables, in alternating fashion;
    at least one housing side stop operably associated with each of said workpiece aligning tables at a side thereof; and
    a clamping device operably associated with said workpiece supporting table for fixing workpieces or panel blanks thereon.

2. The invention according to claim 1, wherein said drilling machine further comprises:
    said drilling device being arranged below said workpiece supporting table; and
    said workpiece supporting table further having an opening positioned above said drilling device.

3. The invention according to claim 1, wherein said drilling device further comprises two horizontal drill spindles arranged coaxially with each other and extending in opposite directions for end face drilling.

4. The invention according to claim 1, wherein said drilling device further comprises two horizontal drill spindles arranged parallel to each other and extending in opposite directions for end face drilling.

5. The invention according to claim 1, wherein said drilling device further comprises a slide-type carrier which is horizontally displaceable and immobilizable along a guide frame.

* * * * *